United States Patent
Bandaru et al.

(10) Patent No.: US 6,775,989 B2
(45) Date of Patent: Aug. 17, 2004

(54) CATALYST SUPPORT PLATE ASSEMBLY AND RELATED METHODS FOR CATALYTIC COMBUSTION

(75) Inventors: Ramarao V. Bandaru, Orlando, FL (US); John Carl Glessner, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 48 days.

(21) Appl. No.: 10/244,064

(22) Filed: Sep. 13, 2002

(65) Prior Publication Data

US 2004/0050053 A1 Mar. 18, 2004

(51) Int. Cl.[7] .............................................. F23R 3/40
(52) U.S. Cl. .............................. 60/777; 60/723; 431/7; 431/170
(58) Field of Search .................... 60/723, 777; 431/170, 431/326, 7

(56) References Cited

U.S. PATENT DOCUMENTS

| | | | |
|---|---|---|---|
| 4,353,206 A | 10/1982 | Lee | 60/39.18 |
| 4,353,207 A | 10/1982 | Lee | 60/39.18 |
| 4,413,470 A | 11/1983 | Scheihing et al. | 60/39.32 |
| 4,870,824 A | 10/1989 | Young et al. | 60/723 |
| 5,281,128 A * | 1/1994 | Dalla Betta et al. | 431/7 |
| 5,346,389 A * | 9/1994 | Retallick et al. | 431/170 |
| 5,355,668 A | 10/1994 | Weil et al. | 60/39.06 |
| 5,512,250 A * | 4/1996 | Betta et al. | 422/173 |
| 5,518,697 A * | 5/1996 | Dalla Betta et al. | 60/723 |
| 5,577,906 A * | 11/1996 | Hanakata et al. | 431/268 |
| 5,850,731 A | 12/1998 | Beebe et al. | 60/39.06 |
| 6,116,014 A * | 9/2000 | Dalla Betta et al. | 60/777 |
| 6,174,159 B1 * | 1/2001 | Smith et al. | 431/170 |
| 6,358,040 B1 * | 3/2002 | Pfefferle et al. | 431/7 |
| 6,358,879 B1 | 3/2002 | Pfefferle et al. | 502/302 |
| 6,415,608 B1 | 7/2002 | Newburry | 60/723 |

* cited by examiner

Primary Examiner—Ted Kim

(57) ABSTRACT

A catalytic combustor 30 includes a frame 32 and catalyst support plate assemblies 34 carried by the frame. A catalyst support plate assembly 34 includes a pair of opposing plates 36A, 36B, at least one having ridges 38A, 38B that define passageways 40 between the pair of opposing plates. A catalyst 44 is carried by the catalyst support plate assemblies 34. Both of the opposing plates 36A, 36B may have ridges 38A, 38B with valleys 42A, 42B between adjacent ridges. A pair of opposing plates 36A, 36B may be aligned and connected at opposing ridges 38A, 38B so that opposing valleys 42A, 42B define air passageways having predetermined shapes. The catalyst support plate assemblies 34 may be arranged in back-to-back relation so that adjacent pairs of catalyst support plate assemblies 34 define fuel/air passageways 46. Adjacent pairs of catalyst support plate assemblies 34 may be offset from one another to define a nested configuration.

22 Claims, 7 Drawing Sheets

CATALYST SUPPORT PLATE ASSEMBLY AND RELATED METHODS FOR CATALYTIC COMBUSTION

FIELD OF THE INVENTION

The present invention relates to the field of combustion turbines, and, more particularly, to a catalytic combustor for a combustion turbine.

BACKGROUND OF THE INVENTION

A combustion turbine typically includes three main sections. The first is a compressor that takes in air from the atmosphere and compresses it. The second is a combustor that mixes the compressed air with fuel and ignites the mixture. And the third is a turbine that converts the heat energy resulting from combustion into mechanical energy for powering equipment such as a rotating shaft used to drive an electrical power generator.

Among the by-products of the reactions associated with the combustion are nitrogen oxides ($NO_x$), which are known to contribute to air pollution. Because the combustion turbine releases combustion gases back into the atmosphere, strenuous efforts have been made to reduce the content of nitrogen oxides.

An approach to controlling nitrogen oxide emissions during operation of the combustion turbine uses a catalytic combustor. A catalytic combustor uses a catalyst to facilitate combustion so that it can occur at lower temperatures than those associated with conventional combustors (i.e., about 2500° F. versus about 4500° F. with conventional combustors). The lower temperatures are typically too low to promote oxidation of nitrogen, and thus the emission of nitrogen oxides can be reduced.

Some catalytic combustors premix fuel and air prior to combustion so that the mixture is relatively lean with respect to fuel (i.e., a lean fuel mixture). During combustion, excess air absorbs heat and accordingly limits the rise in temperature of the products of combustion so that the production of nitrogen oxides is curtailed or prevented.

A problem associated with the use of a lean fuel mixture is that the typical catalyst may not be active at the temperature at which the mixture components leave the compressor (i.e., compressor discharge temperature). A second problem relates to heavy duty combustion turbines in which, even with a lean fuel mixture, the load is so great that the temperature needed for combustion overheats the catalyst as the mixture passes over the catalyst.

One approach to the first problem is to use a preburner, as disclosed, for example, in U.S. Pat. No. 5,850,731 to Beebe et al. The preburner is incorporated into the combustion turbine to heat air prior to its reaching the catalyst. Beebe et al. also addresses the second problem in disclosing a post-catalytic combustion zone. The post-catalytic combustion zone is part of the combustor and is downstream of a catalytic combustion zone. Additional lean fuel and air mixture is supplied to the post-catalytic combustion zone when the combustion turbine is operated at high-load conditions.

Although catalytic combustors using lean fuel mixtures may reduce nitrogen oxide emissions, the additional devices such as preburners often needed to overcome problems associated with the combustion of such a mixture can be costly and add to the complexity of the catalytic combustor. Moreover, with added complexity, there are more opportunities for operational difficulties and breakdowns.

Accordingly, other catalytic combustors use a rich fuel and air mixture. A problem associated with the rich fuel and air mixture, however, is that its combustion leads to greater temperature increases as compared to the lean fuel and air mixture. The increased temperature can damage the catalyst. Thus, while the use of the rich fuel and air mixture overcomes the problems associated with a lean fuel and air mixture, it gives rise to a different problem—namely, that of increased temperatures during catalytic combustion.

One approach is to provide parallel passages, some of which are lined with a catalyst and others of which are not lined. Combustion occurs in the catalyst-lined passages when the fuel and air mixture flows through them, but not in the unlined ones. Thus, the mixture in the unlined passages remains cool and serves to reduce the temperature rise associated with the combustion in the catalyst-lined passages.

Conventionally, the parallel passages are provided by a honeycomb structure as disclosed, for example, in U.S. Pat. No. 4,870,824 to Young et al. and U.S. Pat. No. 4,413,470 to Scheihing et al. Both Young et al. and Scheihing et al. disclose catalytic combustors that comprise a can or housing within which a honeycomb structure is supported.

Young et al., more particularly, describes the honeycomb structure as comprising a plurality of criss-cross intersecting walls defining a series of parallel passages. A catalyst is coated on selected wall surfaces, whereas other wall surfaces remain free of catalyst coating. A mixture passes through the latter passages without reacting to generate heat, but instead providing passive cooling.

Although honeycomb structures can provide desired cooling, their downstream mixing characteristics with respect to the heated gases that are subsequently passed to the turbine are less than desirable. An alternative, therefore, is to provide the similar style cooling using tube arrays. Like honeycomb structures, however, tube arrays are susceptible to vibration-induced stress and fatigue.

SUMMARY OF THE INVENTION

In view of the foregoing background, it is therefore an object of the present invention to provide a more robust catalytic combustor having good downstream mixing characteristics.

This and other objects, features, and advantages in accordance with the present invention are provided by a catalytic combustor having a frame that carries a plurality of catalyst support plate assemblies that are less susceptible to vibration-induced stress and that provide effective downstream mixing. The catalyst support plate assemblies carried by the frame may each comprise a pair of opposing plates. At least one of the plates may have ridges thereon to define passageways between the pair of opposing plates. A catalyst may be carried by each of the catalyst support plate assemblies.

In one embodiment, both opposing plates of a catalyst support plate assembly have ridges, and valleys extend between adjacent ridges. Accordingly, a pair of opposing plates may be aligned with respect to one another and be connected at their opposing ridges to define air passageways of a predetermined shape. More particularly, the predetermined shape of the air passageways may be circular. Additionally, the predetermined shape of the air passageways may be flared at an outlet end of the catalytic combustor.

The catalyst support plate assemblies may be arranged in a back-to-back relation so that adjacent pairs of catalyst support plate assemblies define fuel/air passageways therebetween. Adjacent pairs of catalyst support plate assemblies also may be offset from one another to define a nested configuration.

Some or all of the catalyst support plate assemblies may carry a catalyst. Thus, the fuel/air passageways may be lined with the catalyst. More particularly, catalyst material may be coated on the opposing surface of the valleys of one or both opposing plates of a support plate assembly. As catalyst-assisted combustion occurs, cooling air flowing within the air passageways provides cooling.

The plurality of catalyst support plate assemblies may be arranged in a plurality of trapezoidally shaped modules. The modules, in turn, may be arranged to collectively define a generally circular shape with a central passageway extending therethrough.

An additional aspect of the invention relates to a method for making a catalytic combustor. The method may include forming a plurality of plates, at least some of which have ridges with valleys between adjacent ridges. The method also may include assembling the plurality of plates into a plurality of catalyst support plate assemblies such that each catalyst support plate assembly comprises a pair of opposing plates with at least one of the plates having ridges that define air passageways between the opposing plates.

The method may further include arranging the catalyst support plate assemblies in back-to-back relation so that adjacent pairs of catalyst support plate assemblies define fuel/air passageways between the catalyst support plate assemblies. Accordingly, the method also may include coating a catalyst on the catalyst support plate assemblies so that the catalyst lines the fuel/air passageways.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
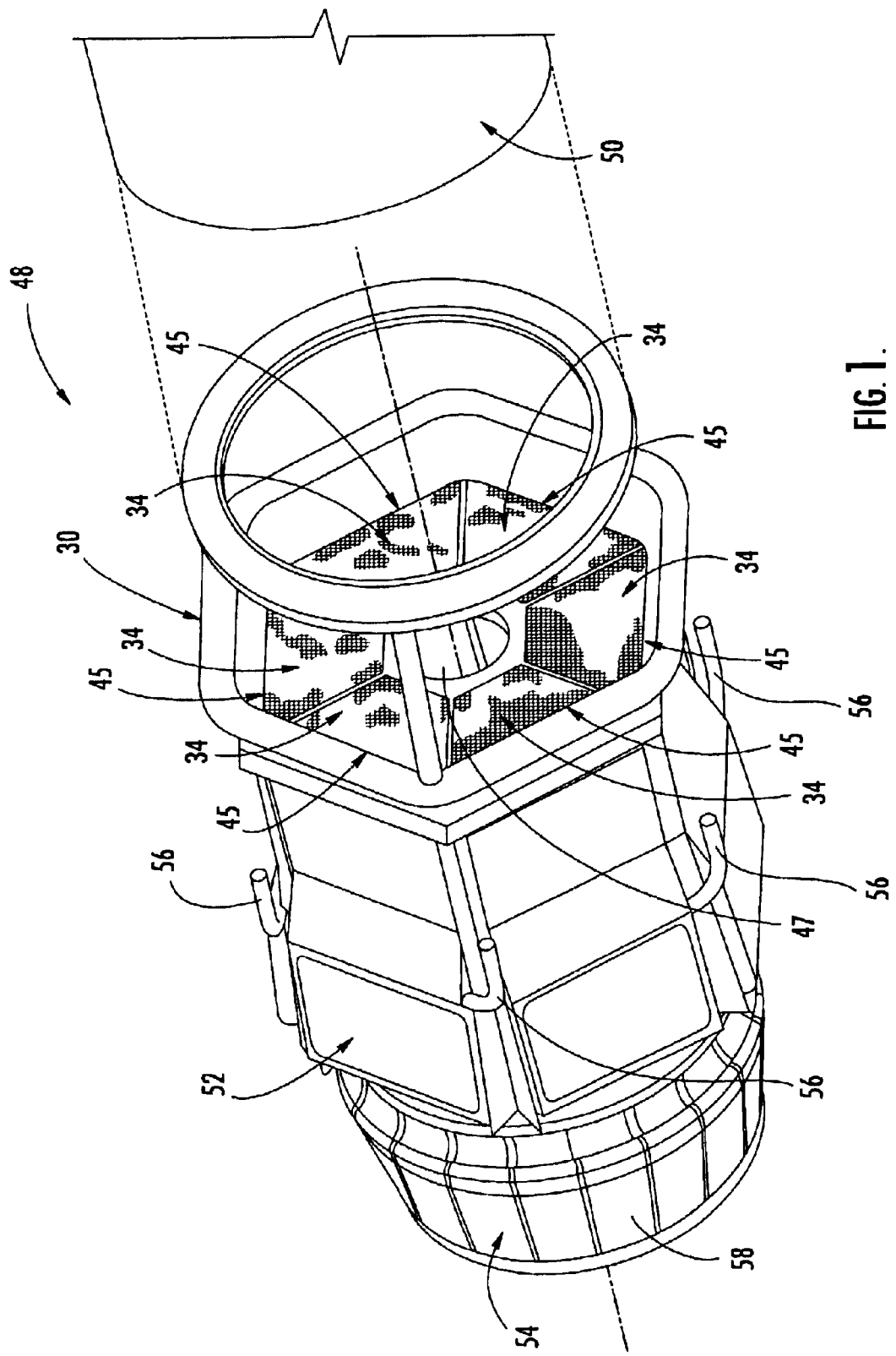
FIG. 1 is a partially exploded perspective view of a combustion turbine including a catalytic combustor according to the present invention.
Figure 2:
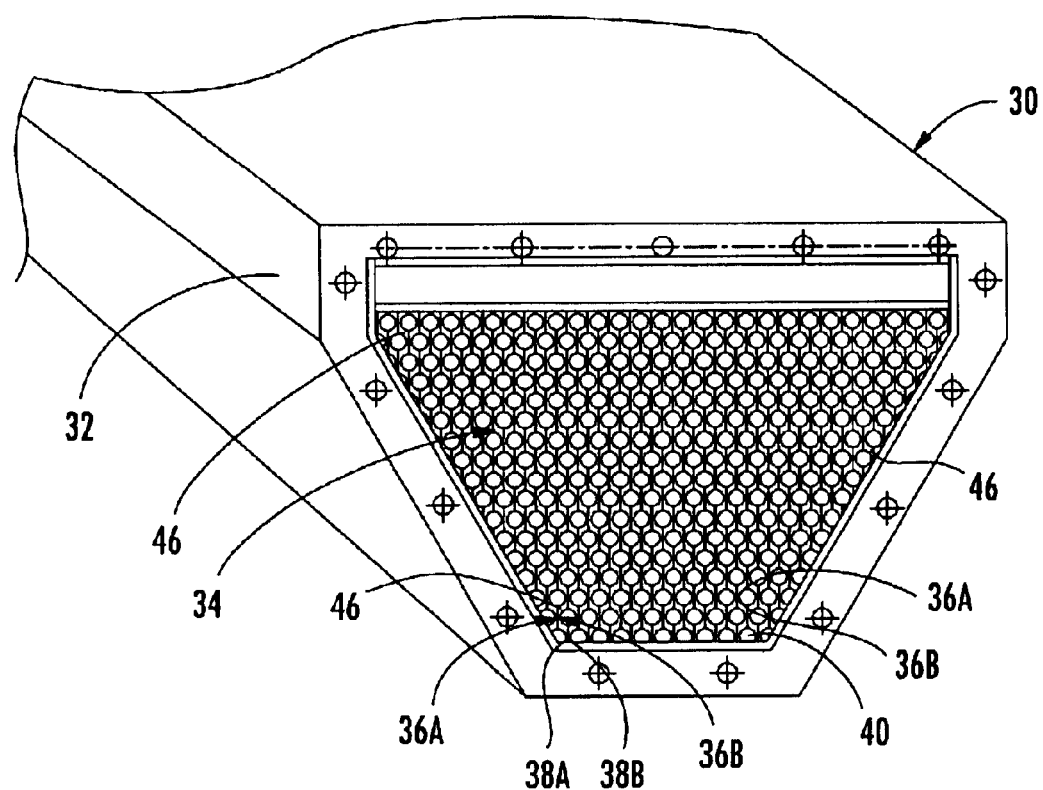
FIG. 2 is a more detailed perspective view of the catalytic combustor in FIG. 1.
Figure 3:
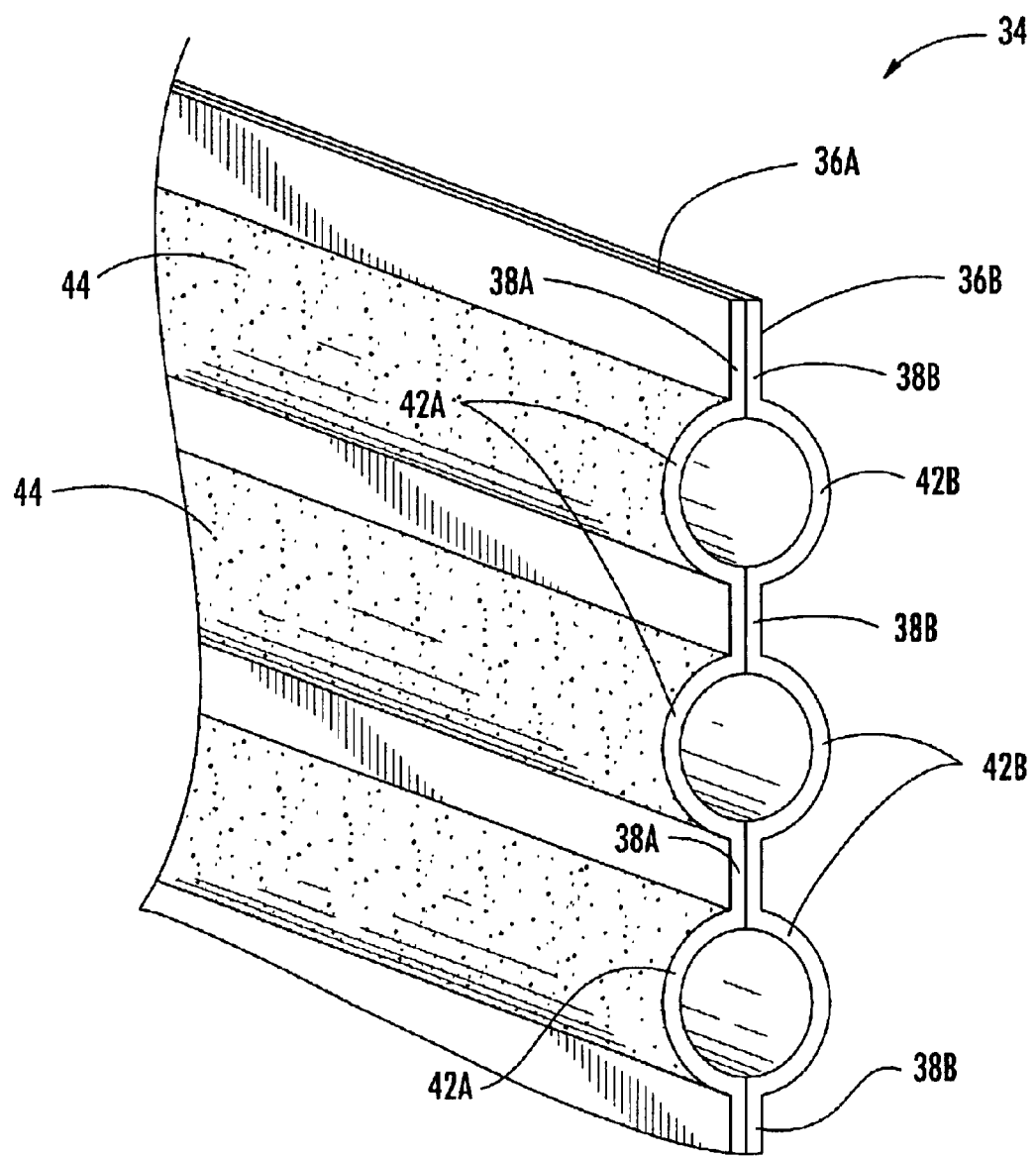
FIG. 3 is an enlarged perspective view of a portion of an upstream end of a catalyst support plate assembly of the catalytic combustor in FIG. 1.

Referring initially to FIGS. 1–3, a combustion turbine 48 including a catalytic combustor 30 in accordance with the invention is now described. The combustion turbine 48 illustratively includes a compressor section 50, a combustor section 52 downstream from the compressor section, and a turbine section 54 downstream from the combustor section. The compressor section 50 includes a compressor to take in and compress ambient air as will be readily understood by those skilled in the art. Compressed air flows to the combustor section 52, which illustratively includes the catalytic combustor 30 to facilitate combustion of a mixture of the ambient air with fuel illustratively supplied by fuel inlets 56. The expansion of hot gases resulting from the combustion drives a turbine 58 included within the turbine section 54, as will also be readily understood by those skilled in the art.

The catalytic combustor 30 illustratively includes a frame 32 and a plurality of catalyst support plate assemblies 34 that are carried by the frame. Each catalyst support plate assembly comprises a pair of opposing plates 36A, 36B. As shown, the opposing plates 36A, 36B of each pair haves ridges 38A, 38B. The ridges 38A, 38B define passageways 40 between the pair of opposing plates 36A, 36B.

Illustratively, the opposing plates 36A, 36B of each catalyst support plate assembly 34 have valleys between 42A, 42B between adjacent ridges 38A, 38B on each of the opposing plates. As shown, each pair of opposing plates 36A, 36B is aligned so that, with the opposing ridges 38A, 38B connected, the opposing valleys 42A, 42B of the respective plates define the passageways 40.

More particularly, the passageways 40 so defined may serve as air passageways for a flow of cooling air. As explained below, these passageways 40 facilitate the cooling of the catalyst support plate assemblies 34 upon which a catalyst 44 is carried.

The passageways 40 have a predetermined shape, such as the illustrated circular shape. Other geometric shapes, of course, are possible. Moreover, only one of the pair of opposing plates 36A, 36B need have ridges and valleys. One of the plates, for example, may be flat, and the other may have ridges and valleys to define passageways between the two opposing plates, as will be readily understood by one skilled in the art.

Figure 4:
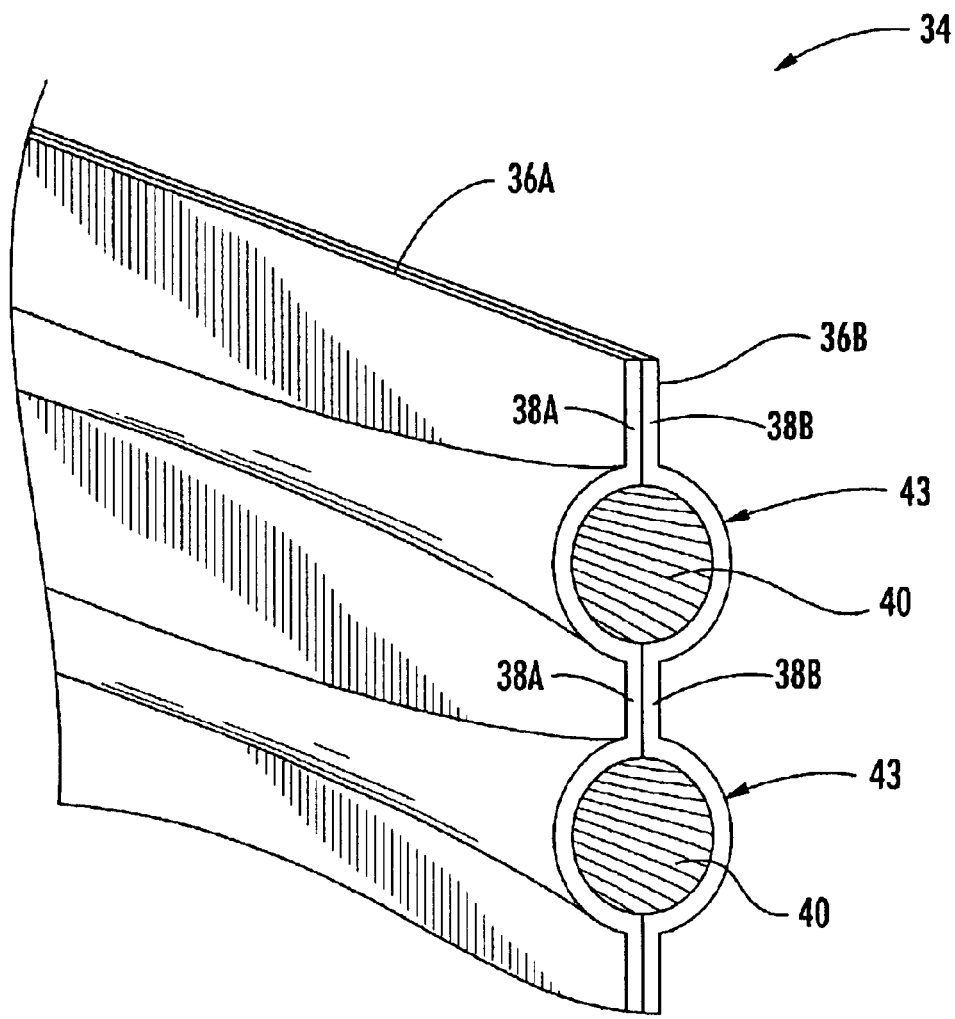
FIG. 4 is an enlarged perspective view of a portion of a downstream end of a catalyst support assembly of the catalytic combustor in FIG. 1.

As illustrated in FIG. 4, downstream outlet ends 43 of the passageways 40 formed by the pair of opposing plates 36A, 36B are flared. The flaring of downstream outlets can enhance the downstream flow and/or mixing of cooling air. In one arrangement, the catalyst support plate assemblies 34 are arrayed so that the flared outlet ends 43 just touch. Accordingly, the amount of flaring in part may determine the amount of space between adjacent catalyst support assemblies 34.

Figure 5:
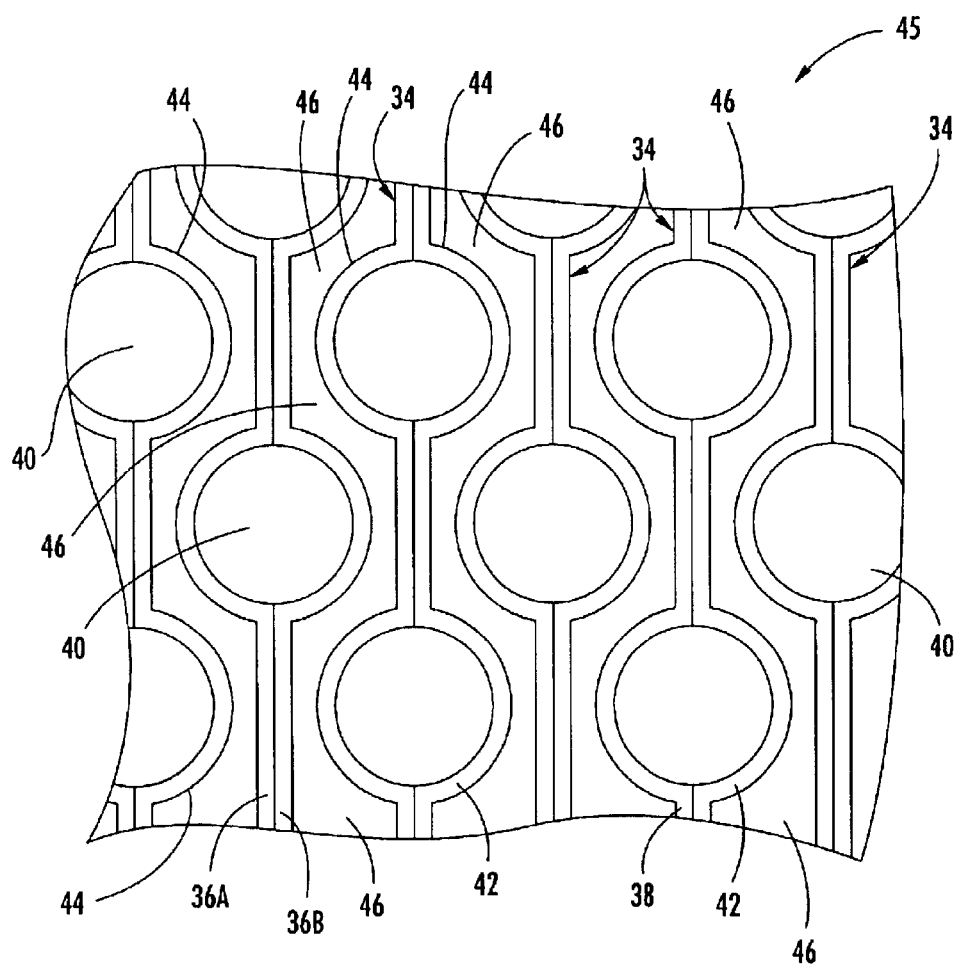
FIG. 5 is an enlarged end view of a plurality of catalyst support plate assemblies of the catalytic combustor in FIG. 1.

More generally, as perhaps best illustrated in FIG. 5, the plurality of catalyst support plate assemblies 34 are arranged in back-to-back relation. Accordingly, adjacent pairs of catalyst support plate assemblies 34 define fuel/air passageways 46 between each adjacent pair. Moreover, as shown, the adjacent pairs of catalyst support plate assemblies 34 are offset from one another to thereby define a nested configuration.

The catalyst 44 is coated or otherwise carried on the opposing side of the valleys 42A, 42B between adjacent ridges 38A, 38B of opposing plates 36A, 36B, as will also be readily understood by those skilled in the art. In other words, the catalyst 44 lines the air/fuel passageways 46. The catalyst thus carried by the opposing plates 36A, 36B assists the combustion of the fuel/air mix that is ignited to create a heated working gas. As described above and as will be readily familiar to those skilled in the art, as the heated working gas expands it drives the turbine 58.

Illustratively, the plurality of catalyst support plate assemblies 34 are arranged to have a trapezoidal shape. Accordingly, the plurality of catalyst support plate assemblies 34 comprise individual trapezoidally shaped modules 45, each enclosed by a distinct frame 32. Referring again now to FIG. 1 in particular, a plurality of such trapezoidally shaped modules 45 is illustratively arranged to collectively define a central passageway 47 within in the combustor section 52 of the combustion turbine 48.

The turbine 52 of the combustion turbine can be used to do mechanical work. For example, the turbine 52 can drive a shaft connected to a generator (not shown) to generate electrical power, as will also be familiar to those skilled in the art. The turbine 58 can similarly drive other types of equipment as well, as will be readily understood by those skilled in the art.

As the reactions associated with the combustion proceed, air flows along the passageways 40 defined by the valleys 42A, 42B between adjacent ridges 38A, 38B on pairs of opposing plates 36A, 36B. The flow of cooling air provides for cooling of the opposite surfaces of the valleys 42A, 42B, surfaces on which the catalyst 44 is carried. Advantageously, the catalyst 44 may be positioned on the opposite surfaces of the valleys 42A, 42B but not on the opposite sides of the ridges 38A, 38B of the plates 36A, 36B. Thus, temperature-raising reactions occur only or primarily adjacent surfaces opposite the surfaces of the passageways 40 through which cooling air flows, thereby enhancing the cooling effect.

The predetermined shapes and arrangements of the air and the fuel/air passageways 40, 46 provide an efficient flow and mixing of the gases that ultimately drive the turbine. Moreover, the plurality catalyst support plate assemblies 34 carried by the frame 32 provide good resistance against harsh vibrations likely to be sustained by the catalytic combustor 30 during operation.

If adjacent pairs of catalyst support plate assemblies 34 are offset from one another, as illustrated, to define a nested configuration, even greater robustness may be achieved owing to the reduced vibration likely to result from the arrangement. This is because the nested arrangement may reduce individual plate vibrations so that the catalyst support plate assemblies 34 uniformly vibrate as or nearly as a single unit. As will be appreciated by those skilled in the art, the arrangement may also significantly increase structural damping of the catalyst support plate assemblies 34 due to the contact between the catalyst support plate assemblies.

To further increase robustness, the frame 32 may have slots in which individual catalyst support plate assemblies 34 may be fitted. Each of the catalyst support plate assemblies 34 can be attached to the frame by brazing, welding, or by mechanical deformation of the catalyst support plate assemblies into the slots. The slots in the frame 32 can also prevent opposing plates 36A, 36B from being carried downstream in the event a catalyst support plate assembly 34 fractures and dislodges from the frame. As will be readily appreciated by those skilled in the art, this effect can be accomplished in a number of alternate ways. For example, downstream on the frame 32, slots can be terminated by making each slot into the shape of an S. Several indentations can be added to the slots.

Figure 6:
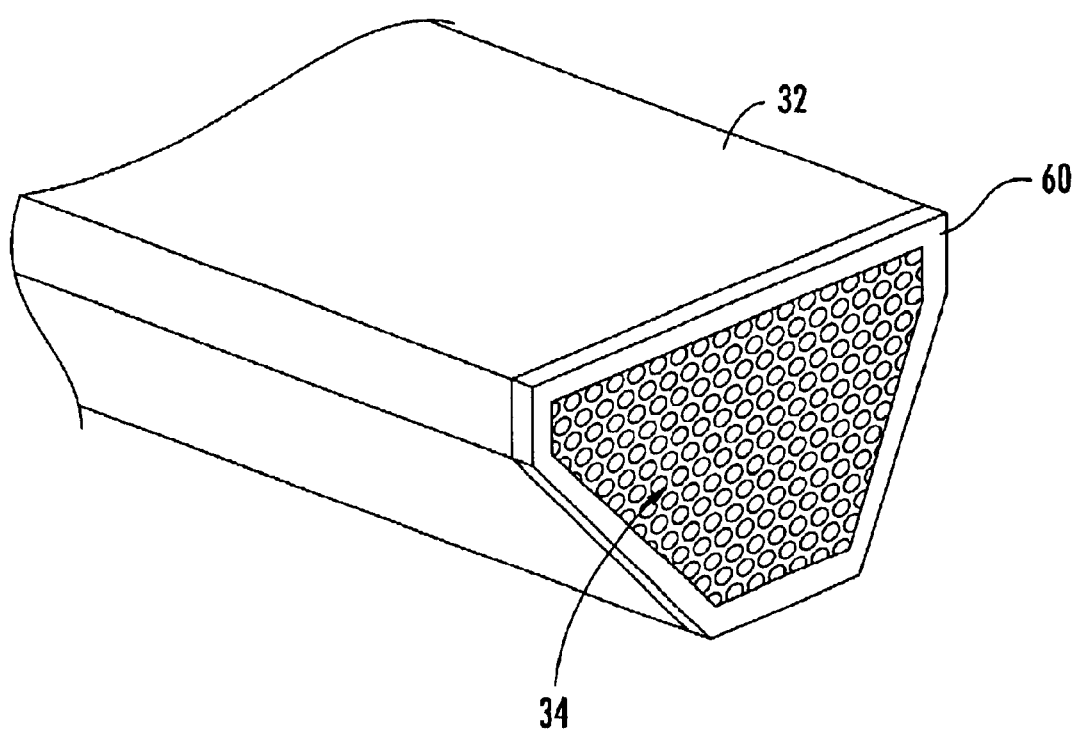
FIG. 6 is a perspective view of a downstream endplate of the catalytic combustor in FIG. 1.

The opposing plates 36A, 36B may be connected, for example, by brazing, resistance welding—steam or spot—as well as by other methods that will be readily envisioned by one skilled in the art. At their upstream end, each catalyst support plate assembly 34 may be attached to a head end plate. The head end plate can serve as a barrier and/or manifold to separate a fuel/air mix that passes over the catalyst from the cooling air that passes within the air passageways 40. Additionally, as illustrated specifically in FIG. 6, a stop member 60 is adjacent an outlet end of the catalytic combustor to prevent a catalyst support plate assembly 34 that may be dislodged from the frame 32 from being drawn downstream to the turbine.

Figure 7:
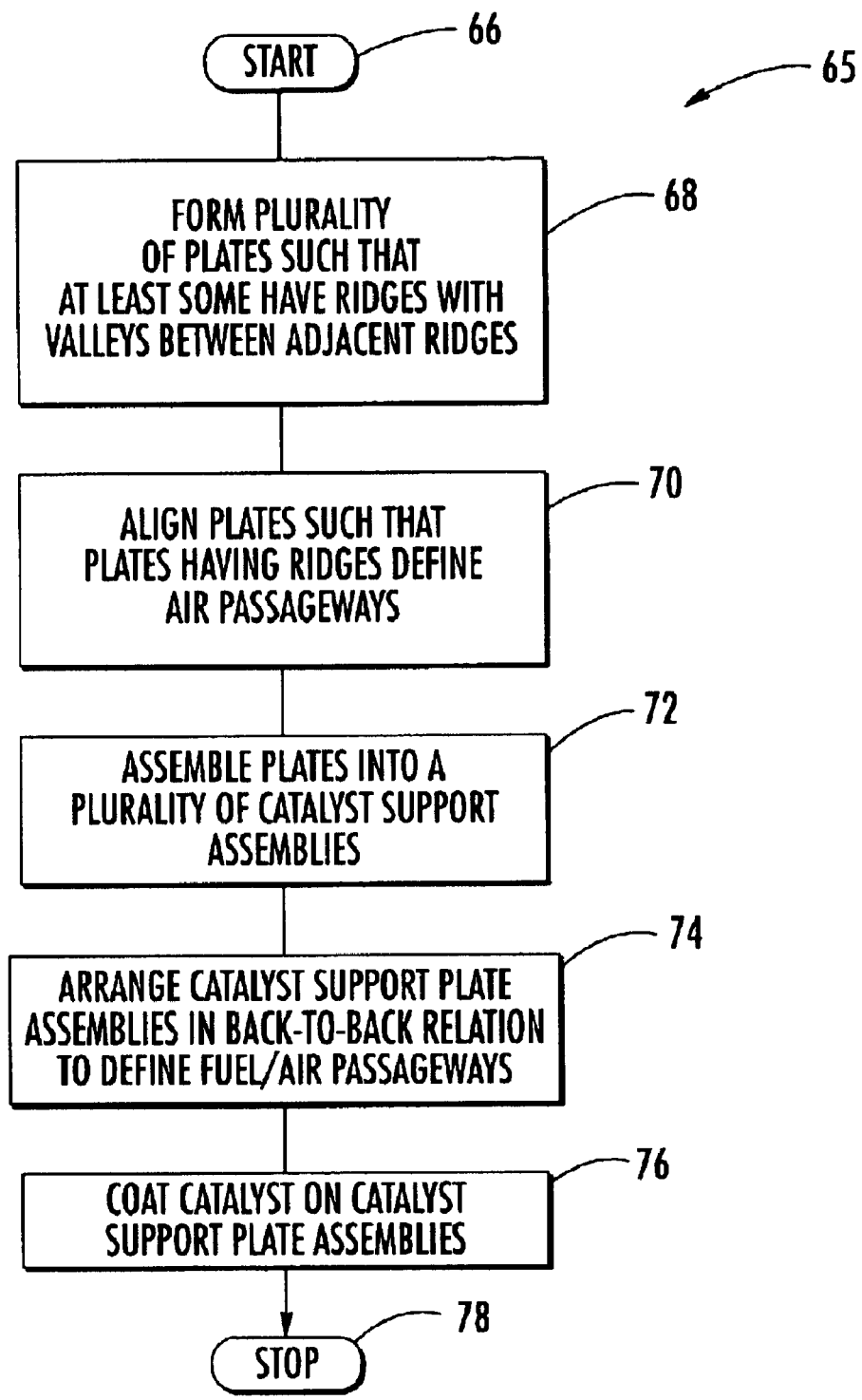
FIG. 7 is a schematic flow diagram of a method for making a catalytic combustor according to the invention.

An additional aspect of the invention relates to a method for making a catalytic combustor 30. The method, as illustrated by the flow diagram 65 in FIG. 7, includes, after the start (Block 66), forming at Block 68 a plurality of plates such that at least some of the plates have ridges 38A, 38B thereon along with valleys 42A, 42B between adjacent ridges. The method further includes assembling the plurality of plates into a plurality of catalyst support plate assemblies 34, each catalyst support plate assembly comprising a pair of opposing plates with at least one of the plates having ridges 38A, 38B thereon to define air passageways 40 between the opposing plates (Block 72).

More particularly, at Block 70, the plates may be aligned so that the plates have ridges 38A, 38B that define the air passageways. Additionally, assembly may comprise offsetting adjacent pairs of catalyst support plate assemblies 34 from one another so that the catalyst support plate assemblies 34 define a nested configuration.

The method also includes at Block 74 arranging the catalyst support plate assemblies 34 in a back-to-back relation so that adjacent pairs of catalyst support plate assemblies define fuel/air passageways 46 between the adjacent pairs. Additionally, the method includes positioning (e.g., by coating) a catalyst 44 on the plurality of catalyst support plate assemblies 34 so that a catalyst lines at least portions of the fuel/air passageways 46.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A catalytic combustor comprising:
   a frame;
   a plurality of catalyst support plate assemblies carried by said frame, each catalyst support plate assembly comprising a pair of opposing plates with at least one of the plates having ridges thereon to define passageways between the pair of opposing plates;
   said catalyst support plate assemblies being arranged in back-to-back relation and with adjacent pairs of catalyst support plate assemblies being offset from one another to define a nested configuration; and
   a catalyst carried by said catalyst support plate assemblies.

2. A catalytic combustor according to claim 1 wherein both opposing plates have ridges thereon and valleys between adjacent ridges; and wherein the pair of opposing plates are aligned and connected at opposing ridges so that opposing valleys define air passageways of predetermined shape therebetween.

3. A catalytic combustor according to claim 2 wherein the predetermined shape of the air passageways is circular.

4. A catalytic combustor according to claim 2 wherein the predetermined shape of the air passageways is flared at an outlet end of the catalytic combustor.

5. A catalytic combustor according to claim 2 wherein adjacent pairs of catalyst support plate assemblies define fuel/air passageways therebetween.

6. A catalytic combustor according to claim 5 wherein said catalyst is carried by said catalyst support plate assemblies to line the fuel/air passageways.

7. A catalytic combustor according to claim 1 wherein said plurality of catalyst support plate assemblies are arranged in a plurality of trapezoidally shaped modules; and wherein the trapozoidally shaped modules are arranged to collectively define a generally circular shape with a central passageway therethrough.

8. A catalytic combustor according to claim 1 further comprising a stop member adjacent an outlet end of the catalytic combustor.

9. A catalytic combustor comprising:
   a plurality of catalyst support plate assemblies, each catalyst support plate assembly comprising a pair of opposing plates each with ridges thereon and valleys between adjacent ridges so that opposing valleys define air passageways of predetermined shape therebetween;
   said catalyst support plate assemblies being arranged in back-to-back relation and with adjacent pairs of catalyst support plate assemblies being offset from one another to define a nested configuration; and
   a catalyst carried by said catalyst support plate assemblies.

10. A catalytic combustor according to claim 9 wherein the predetermined shape of the air passageways is circular.

11. A catalytic combustor according to claim 9 wherein the predetermined shape of the air passageways is flared at an outlet end of the catalytic combustor.

12. A catalytic combustor according to claim 9 wherein adjacent pairs of catalyst support plate assemblies define fuel/air passageways therebetween, and wherein said catalyst is carried by said catalyst support plate assemblies to line the fuel/air passageways.

13. A combustion turbine comprising:
   a catalytic combustor and a turbine section downstream therefrom;
   said catalytic combustor comprising
      a plurality of catalyst support plate assemblies, each catalyst support plate assembly comprising a pair of opposing plates with at least one of the plates having ridges thereon to define passageways between the pair of opposing plates
      said catalyst support plate assemblies being arranged in back-to-back relation and with adjacent pairs of catalyst support plate assemblies being offset from one another to define a nested configuration, and
      a catalyst carried by said catalyst support plate assemblies.

14. A combustion turbine according to claim 13 wherein both opposing plates have ridges thereon and valleys between adjacent ridges; and wherein the pair of opposing plates are aligned and connected at opposing ridges so that opposing valleys define air passageways of circular shape therebetween.

15. A combustion turbine according to claim 13 wherein adjacent pairs of catalyst support plate assemblies define fuel/air passageways therebetween, and wherein said catalyst is carried by said catalyst support plate assemblies to line the fuel/air passageways.

16. A method for making a catalytic combustor comprising:
   forming a plurality of plates, at least some of which having ridges thereon and valleys between adjacent ridges;
   assembling the plurality of plates into a plurality of catalyst support plate assemblies, each catalyst support plate assembly comprising a pair of opposing plates with at least one of the plates having ridges thereon to define air passageways between the opposing plates;
   arranging the catalyst support plate assemblies in back-to-back relation so that adjacent pairs of catalyst support plate assemblies define fuel/air passageways therebetween with adjacent pairs of catalyst support plate assemblies being offset from one another to define a nested configuration; and
   coating a catalyst on the catalyst support plate assemblies to line the fuel/air passageways.

17. A method according to claim 16 wherein all of the plates have ridges thereon and valleys between adjacent ridges; and wherein assembling comprises aligning and connecting the opposing plates together at opposing ridges so that opposing valleys define air passageways of predetermined shape therebetween.

18. A method according to claim 17 wherein the predetermined shape of the air passageways is circular.

19. A method according to claim 17 wherein the predetermined shape of the air passageways is flared at an outlet end of the catalytic combustor.

20. A catalytic combustor comprising:
   a plurality of catalyst support plate assemblies, each catalyst support plate assembly comprising a pair of opposing plates each with ridges thereon and valleys between adjacent ridges so that opposing valleys define passageways of circular shape therebetween that are flared and define peripheral portions of adjacent passageways that are spaced apart from one another at an outlet end of the catalytic combustor; and
   a catalyst carried by said catalyst support plate assemblies.

21. A catalytic combustor according to claim 20 wherein adjacent pairs of catalyst support plate assemblies are offset from one another to define a nested configuration.

22. A catalytic combustor according to claim 20 further comprising a frame mounting said plurality of catalyst support plates.

* * * * *